(12) United States Patent
Ovnicek et al.

(10) Patent No.: US 8,826,996 B2
(45) Date of Patent: Sep. 9, 2014

(54) HORSESHOE AND BALANCING METHOD

(76) Inventors: Eugene D. Ovnicek, Penrose, CO (US);
David J. Nicholls, Worthing (GB);
Mark S. Spriggs, Henfield (GB);
Michael J. Williams, Horsham (GB);
Tfm Head, Milton Keynes (GB)

( * ) Notice: Subject to any disclaimer, the term of this patent is extended or adjusted under 35 U.S.C. 154(b) by 284 days.

(21) Appl. No.: 11/831,479

(22) Filed: Jul. 31, 2007

(65) Prior Publication Data

US 2009/0032269 A1    Feb. 5, 2009

(51) Int. Cl.
| | |
|---|---|
| *A01L 3/00* | (2006.01) |
| *A01K 13/00* | (2006.01) |
| *A01L 7/02* | (2006.01) |
| *A01L 3/06* | (2006.01) |

(52) U.S. Cl.
CPC .................. *A01K 13/007* (2013.01); *A01L 7/02* (2013.01); *A01L 3/06* (2013.01)
USPC ............................................................ 168/4

(58) Field of Classification Search
USPC .......... 168/4, 12, 17, 23, 45; 33/195; 434/225
See application file for complete search history.

(56) References Cited

U.S. PATENT DOCUMENTS

| | | | | | |
|---|---|---|---|---|---|
| 82,213 | A | * | 9/1868 | Ferren | 33/195 |
| 789,100 | A | * | 5/1905 | Murray | 33/195 |
| 4,214,370 | A | * | 7/1980 | Beaston | 33/195 |
| 4,813,148 | A | * | 3/1989 | Finnegan | 33/195 |
| 5,027,520 | A | * | 7/1991 | Finnegan | 33/195 |
| 5,566,765 | A | * | 10/1996 | Ovnicek | 168/4 |
| 5,727,633 | A | * | 3/1998 | Ovnicek | 168/24 |
| 6,360,824 | B1 | * | 3/2002 | Singley | 168/45 |
| 6,672,395 | B1 | * | 1/2004 | Ovnicek | 168/14 |
| 6,688,401 | B2 | * | 2/2004 | Smith | 168/13 |
| 7,596,875 | B2 | * | 10/2009 | Ross | 33/195 |
| 2006/0201686 | A1 | * | 9/2006 | Healey | 168/45 |
| 2006/0207772 | A1 | * | 9/2006 | Justis | 168/4 |
| 2008/0078562 | A1 | * | 4/2008 | Kirkpatrick et al. | 168/14 |

FOREIGN PATENT DOCUMENTS

DE    3423838 A1 *    1/1986    ............... A01L 5/00

OTHER PUBLICATIONS

Don Blazer, "Is Your Horse Shod Right?", 2002.*

* cited by examiner

*Primary Examiner* — Son T Nguyen (57) ABSTRACT

Apparatus and method for applying novel horseshoes to the hoof of a horse comprising the steps of, establishing the apex of the hoof wall curve that defines each lateral side of the hoof wall, and applying a horseshoe to the hoof by aligning the longitudinal mid line of each arm of the horseshoe with the respective apex on each lateral side of the hoof wall and aligning the heels of the horseshoe arms with the caudal part of the central sulcus of the hoof's frog.

3 Claims, 7 Drawing Sheets

HORSESHOE AND BALANCING METHOD

BACKGROUND OF THE INVENTION

Beginning in the Middle Ages, when rawhide boots were tied onto horse's hooves, horse owners have sought to remedy the hoof problems of domesticated horses. Following these earliest attempts at protecting the horse's feet, metal horseshoes were developed that are nailed to the outer rim of the sole.

However, in spite of the long history of horseshoes and their importance in maintaining equine health there has been little in the way of research and investigation into the interaction between horseshoes and hoof physiology. It is only recently that well directed scientific investigations, including studies of a large number of wild horses have shown that many generally accepted traditional beliefs about horseshoes and hoof care are untrue and have in fact contributed to chronic hoof problems in domestic horses.

Among other things, studies have shown that horses having thin hoof walls, thin soles and contracted heels are minimal occurrences in wild horses. In general, barefoot wild horses have much better feet than domestic horses. Like domestic horses, angles of the hoof wall to the ground vary some but are generally around 55 degrees. The feet of wild horses that travel over abrasive surfaces are fairly short with a healthy horn mass that is rounded aggressively to the border of the sole. Less outer wall radius is seen in areas where the ground is more forgiving. In all instances the walls, soles and frogs are thick and dense. These features allow wild horses to travel barefoot over great distances on very hard terrain while still remaining sound.

To the contrary, domestic horses traditionally travel over less varied terrain and hence do not get the continual stimulation, irritation and abrasion that is necessary to keep the hoof wall worn and rounded to the same level as the sole, especially in the anterior portion of the hoof. The functional sole that is generated around the peripheral border and ventral surface of the coffin bone (PIII) regulates the hoof wall length. In the natural setting the sole becomes harder and more durable than the hoof wall itself because of its ability to adjust for changes in the environment, (i.e. wet or dry, soft or hard). In light of the adaptive ability of the sole and its function in regulating the length of the hoof wall, the sole of the equine foot plays an important role in hoof balance. The optimal function of the equine foot depends on absorbing energy upon ground contact and maintaining equilibrium while in motion to insure minimal stress and strain to the DIP joint.

These discoveries have increased the focus of farriers and veterinarians on means and methods of retaining the benefits of horseshoes while, at the same time, maintaining the innate natural hoof balance of wild horses and maintaining healthy distal phalanges alignment by reducing unnatural stress on the tendons and joints in the lower leg of the horse.

The U.S. patents to Duckett, U.S. Pat. Nos. 5,165,481 and 5,368,104 are examples of prior efforts to fix a balance point on a horseshoe that has a relationship with the axis of rotation of the coffin bone (PIII) about the second phalanx (PII), similar to the unshod hoof of a wild horse.

Antecedent to the improved method of the present invention is the acknowledgement that a horse's feet are not all alike, much the same as humans. The likeness of the two front feet for example, is remote. A pair of feet will differ in dorsal hoof angle, width and size. Feet will also differ in the distance measured in the sagital plane between a lateral line connecting the widest parts of the sole and a vertical line passing through the distal interphalangeal joint (DIP joint or coffin joint). Conventional farriery teaches that matching foot pairs is part of the goal in shoeing a horse. If there is a gross difference in foot pairs, a close compromise should be the approach, ignoring the basic truth that the feet are inherently different and should be treated individually. In fact, the entire assessment of foot balance is approached by external appearance of the hoof capsule and its relationship to the upper bones of the pastern.

In addition to the problems induced by this unscientific approach to applying a horseshoe, the prior practice of trimming a horse's hoof to raise the hoof angle also deserves correction. For instance, trimming less of the heel portion of the hoof wall to make the caudal portion taller allows the heel to grow forward and results in shortened distance from the widest part of the sole to the end of the heel. This trimming method results in minimized caudal support by moving the ground contacting portion of the heel buttress forward of the frog buttress. In addition, when the anterior part of the foot is longer than normal (or optimal), the force moment on the toe causes the anterior hoof wall to bend and extend forward, producing an unnatural and exaggerated reduction in the angle of the dorsal hoof wall to the ground. Such deformation of the hoof wall results in grossly unequal distances between the center of balance of the traditionally applied horseshoe at the toe and the center of balance with respect to the heel of the shoe. With this unequal positioning of the horseshoe, the whole foot is out of balance, leading to, among other things, overgrown heels that are weak and become crushed and painful because of their more forward location.

In addition to the problems associated with conventional heel trimming theory, the prior practice teaches that shoes should be fitted from front to back, a technique that accommodates and exacerbates an already distorted hoof, rather than resolving the distortion and normalizing the foot.

SUMMARY OF THE INVENTION

The objective of the method and apparatus of the present invention is to provide improved hoof balance with attendant improvement in general hoof health and gait of the horse. The method and apparatus of the present invention is based on the discovery that the widest part of the foot maintains a consistent and reliable relationship to the rotational surface of the DIP joint of each individual foot. Whereas, the toe, heels and frog apex of said foot can changer their relationship to the rotational surface of the DIP joint (hoof distortion), making these features unreliable as references to the coffin bone. The back part (most caudal aspect) of the frog is also a reliable static reference point for placement of protective devices for the coffin bone and the DIP joint.

According to the present invention the horseshoe should be positioned so that its own center of balance is directly beneath the rotational surface of the distal end of PII, and not a fixed distance from the anterior hoof wall or the hoof wall buttress of the heel. Not only should the center of balance of the horseshoe be below the center of the rotational surface of PII, it should be equidistant from the buttress of the frog to the front of the shoe.

In accordance with the teaching of the present invention, several significant modifications from the prior art of shoeing a horse are taught. First, an understanding that each foot of a horse may be different from the other feet of the horse in its dorsal hoof angle, its width and size and the widest part of the sole next to the ground may align differently with the DIP joint. This means that each foot must be treated and shod independently of the other feet. Second, the heels must be trimmed to the level of the functional tissue of the foot's sole surface. This will position the heel buttress more caudal to the coffin bone and the upper limb, allowing the palmar surfaces of the arms of the shoe to terminate at the caudal most part of the central sulcus of the frog buttress but they will not necessarily extend to the hoof wall buttress. Third, by aligning a central mark on the shoe, or the widest part of the shoe, with the widest part of the foot the center of balance of the shoe will be vertically aligned with the DIP joint. These two static references of the foot will automatically determine the position of the shoe in anterior aspect of the foot. Shoe size is determined by the overall width of the foot, the position of the frog buttress, and their respective relationship to the widest part of the foot.

The device of the present invention, such as a horseshoe, minimizes the forces that cause hoof distortion by equalizing the forces around the coffin bone and the DIP joint. This equilibrium is established when the distance from the widest part of the foot forward to the toe of the device is equal to the distance from the widest part of the foot to the rearward end of the applied device.

DETAILED DESCRIPTION OF PREFERRED EMBODIMENT

Figure 1:
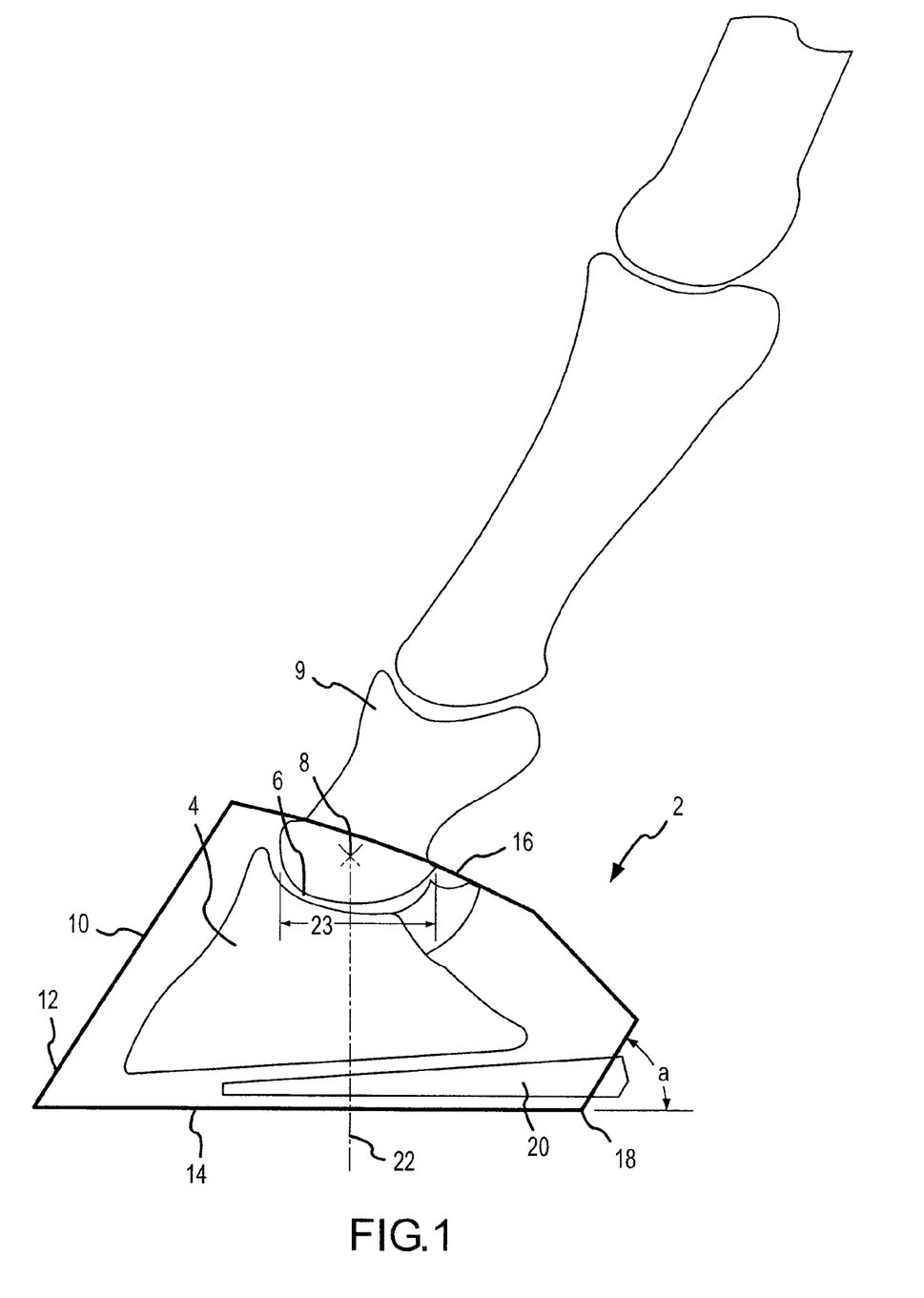
FIG. 1 is a diagrammatic lateral view of the lower leg bones of a horse including the first, second and third phalanges, with the perimeter of the hoof wall shown in bold lines. The illustrated hoof is an example of a normal hoof and one found in a feral horse.

FIG. 1 illustrates what has commonly been referred to as a normal horse hoof 2 such as would be found in a feral horse. The coffin bone (PIII) 4 rotates on the distal interphalangeal (DIP) joint 6 about a center of rotation 8 in the lower part of the second phalanges (PII) 9. A hoof wall comprises an anterior wall 10 descending into a toe portion 12, a ground contacting surface 14, the coronal band 16 and a heel 18. The frog of the hoof is shown by reference numeral 20. In some hooves the center of rotation 8 would be directly above the widest lateral part of the sole surface, as indicated by perpendicular line 22. In practice the widest part of the sole surface will always be within the projected extremities of the second phalanges, as shown by brackets 23. The widest part of the hoof 22 will be the center of balance of the hoof.

Figure 1A:
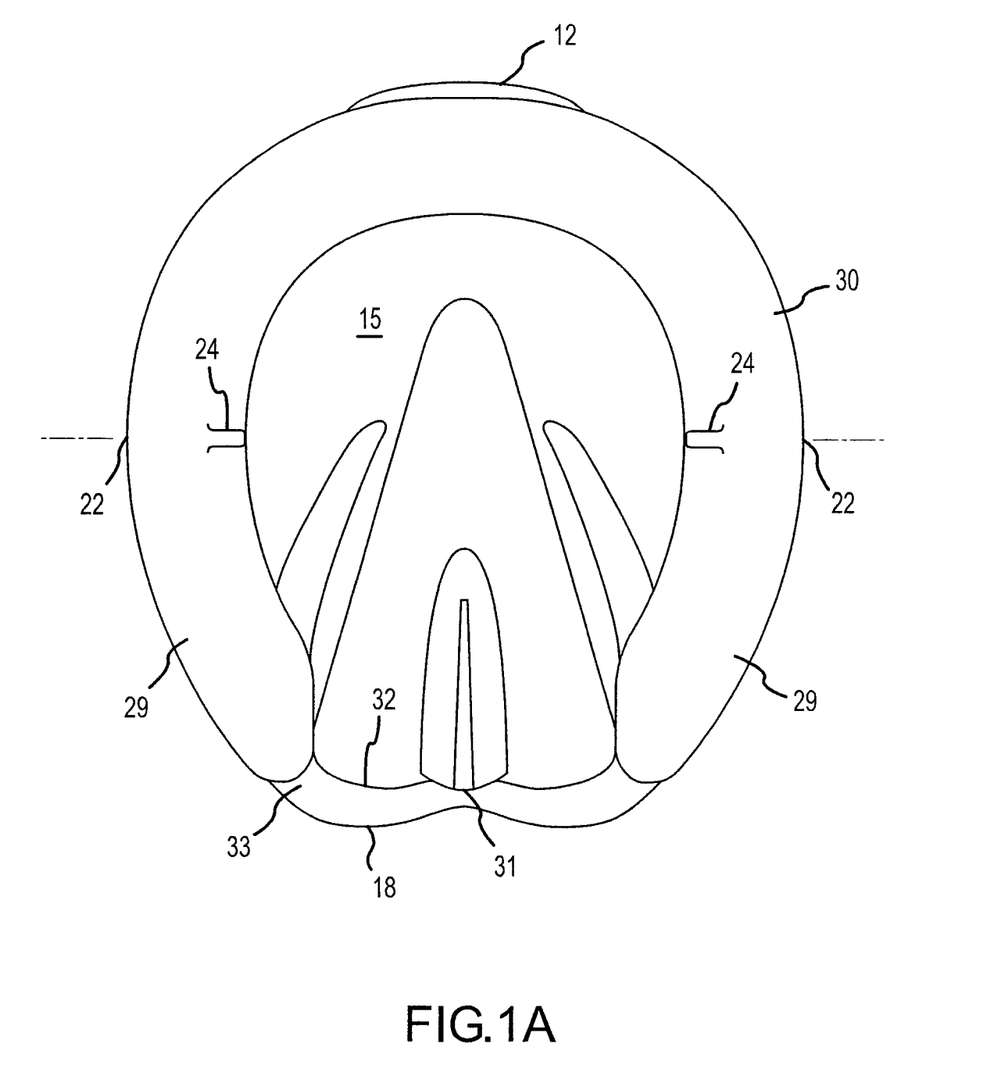
FIG. 1A is a diagrammatic bottom view of the hoof shown in FIG. 1 with a horseshoe applied in accordance with the present invention.

FIG. 1A depicts the model placement of a horseshoe 30 in accordance with the present invention. The widest part of the sole 15 is indicated by reference numeral 22 which is aligned with the visual indicator mid point marks 24 on the respective arms 29 of the horseshoe. The terminal ends of the arms 29 are laterally aligned with the back of the frog 31.

Figure 2:
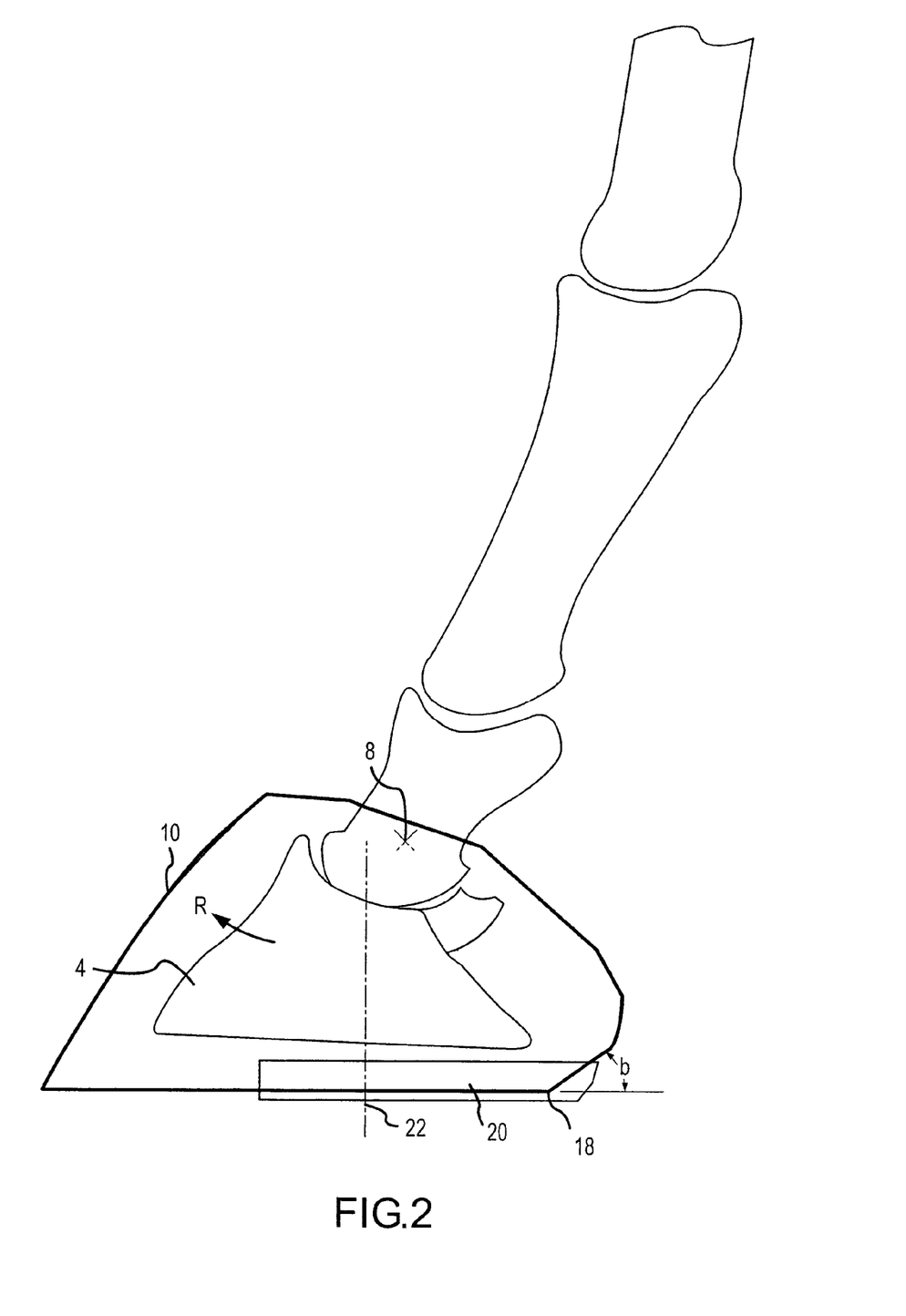
FIG. 2 is similar to FIG. 1 but illustrating a foot where the coffin bone (PIII) has slight negative rotation that moves the center of balance forward in the DIP joint from the position shown in FIG. 1.
Figure 3:
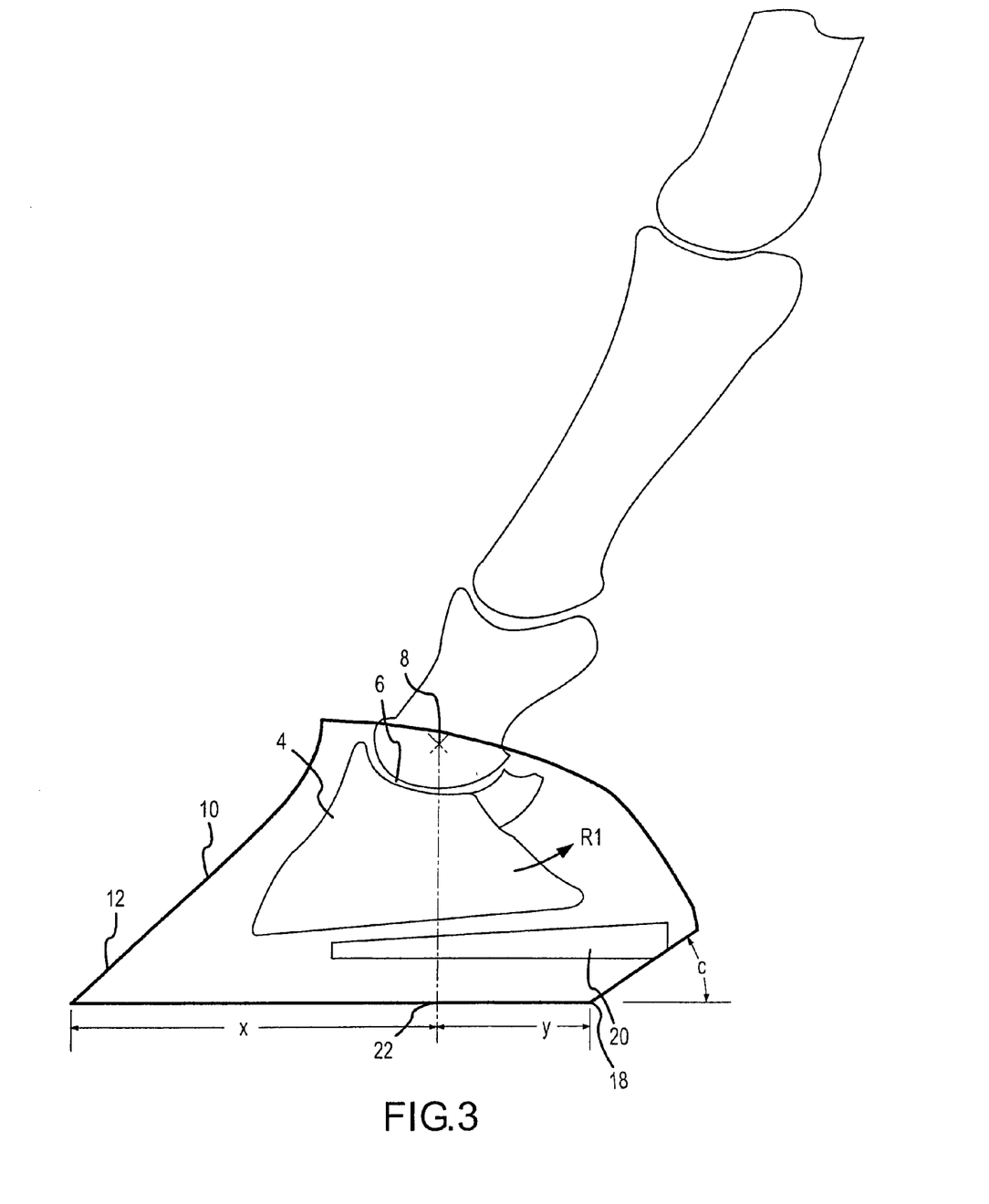
FIG. 3 is similar to FIG. 1 and illustrates the result of allowing the heel to grow forward, often resulting in an elongated toe and heels that terminate closer to the widest part of the foot.
Figure 4:
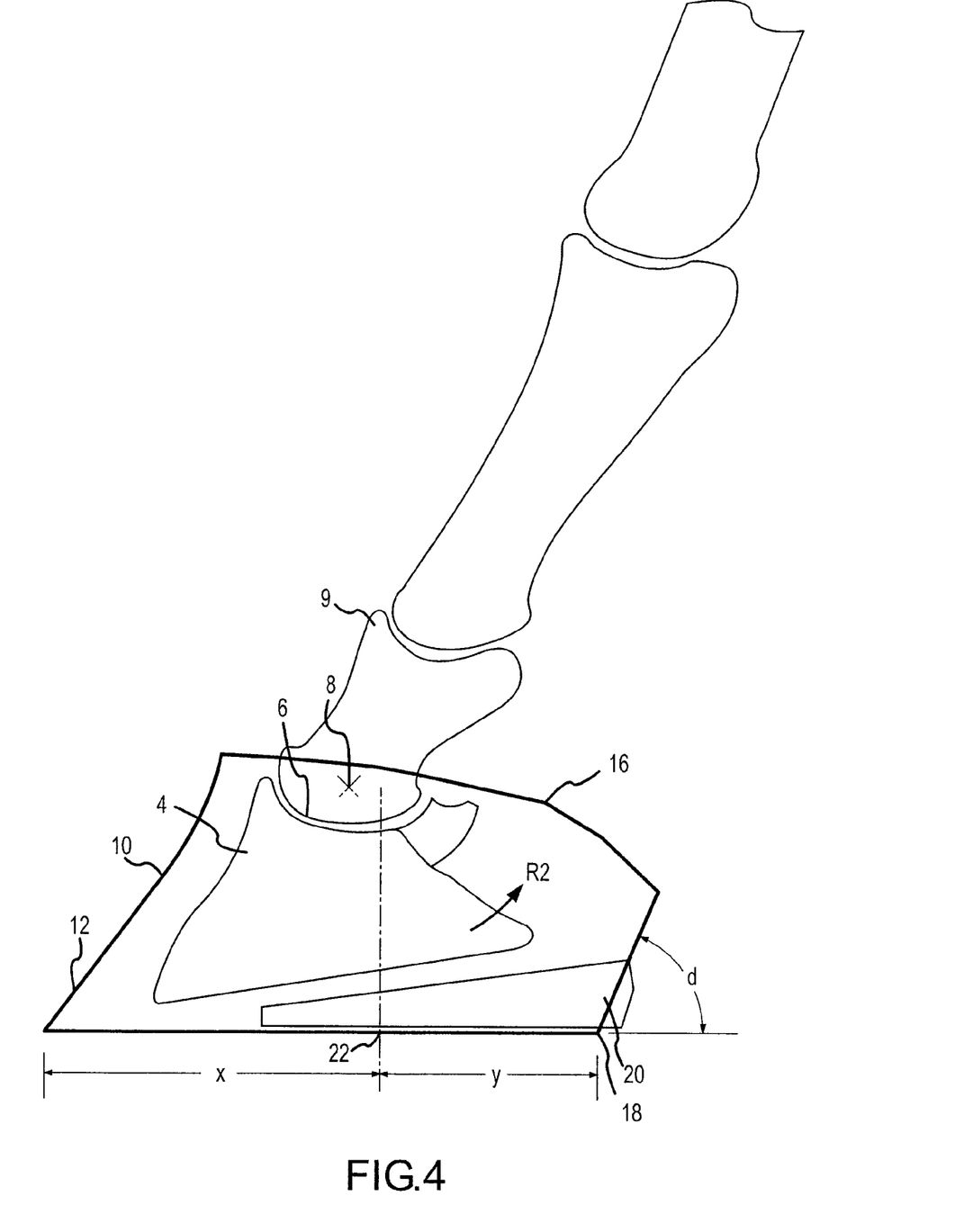
FIG. 4 is similar to FIG. 1 but showing a more upright heel angle that positively rotates the coffin bone, moving the center of balance rearwardly in the DIP joint.

FIGS. 2, 3 and 4 show examples of an altered position of the coffin bone 4 and the altered placement of the center of balance as a result of the differences in the heel trimming or the differences in types of hooves. The low acute angle b of the under run heel shown in FIG. 2 results in a negative rotation R of the coffin bone and consequent forward movement of the center of balance within the DIP joint, resulting in a convex shape to the anterior hoof wall 10 and abnormal growth of the hoof toe.

The heel angle c shown in FIG. 3 is an attempt to realign the distal phalanges by not trimming the excess heel. In theory this procedure will produce a positive rotation R1 of the coffin bone 4 resulting in a rearward shift of the center of balance from that shown in FIG. 2. However, imbalance of the hoof capsule will still exist, caused by the abnormal toe and heel length. The result is unequal distances of x, from the center of balance 22. to the toe 12, and y, from the center of balance 22 to the heel buttress 18.

FIG. 4 illustrates a still different angle of a normal heel representing a club foot with rotation R2 of the coffin bone 4 that creates a rearward placement of the center of balance with respect to the DIP joint and once again a disparity between distances x and y when the hoof becomes distorted by elongation in the toe region.

Having illustrated the means by which the toes and heels of a horses hoof can become distorted and unbalanced we turn to the apparatus and method of the present invention which is intended to cure the problems associated with prior art methods of shoeing horses.

Figure 5:
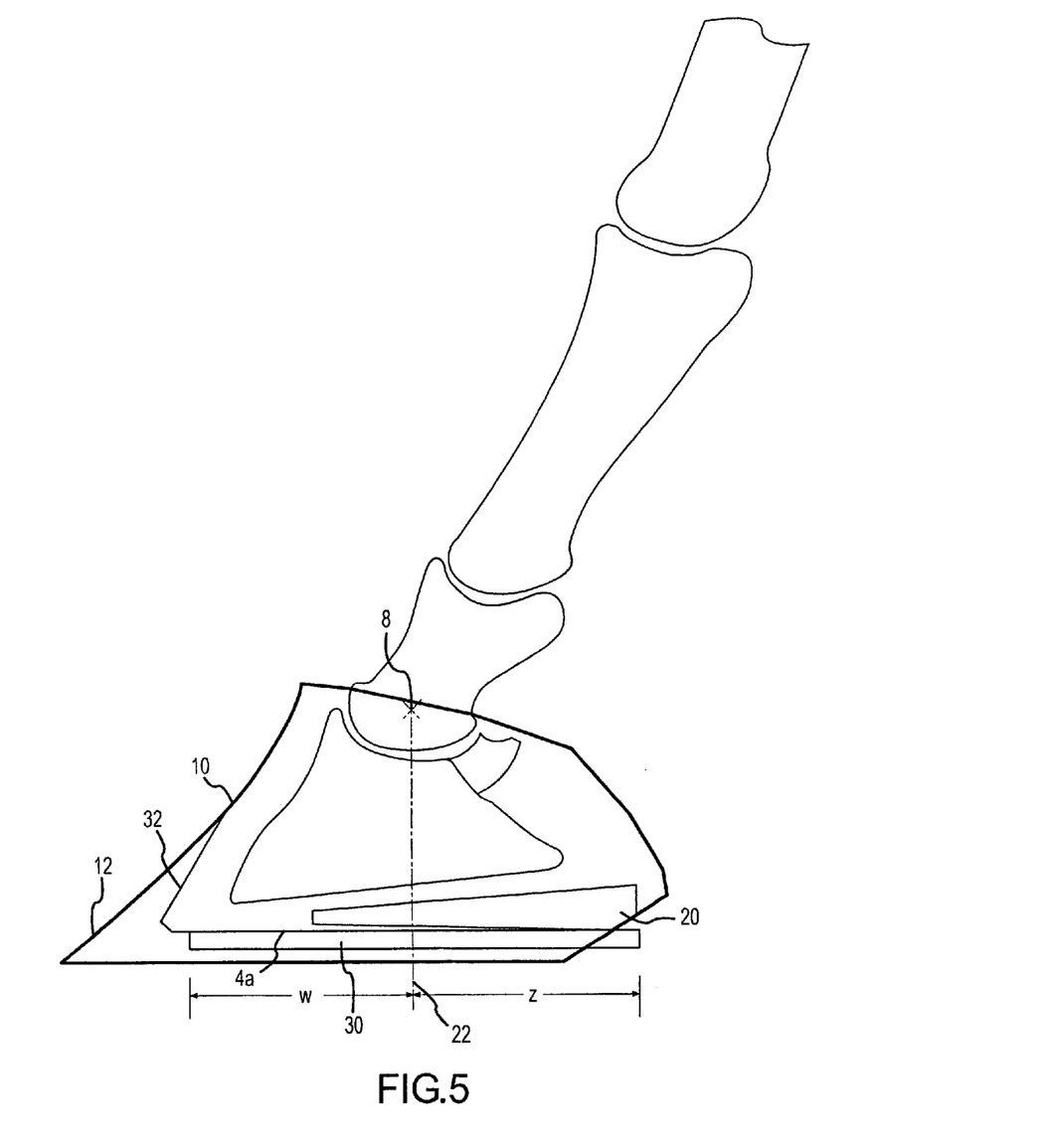
FIG. 5 is similar to FIG. 1 but showing the application of a horseshoe according to the present invention.
Figure 5A:
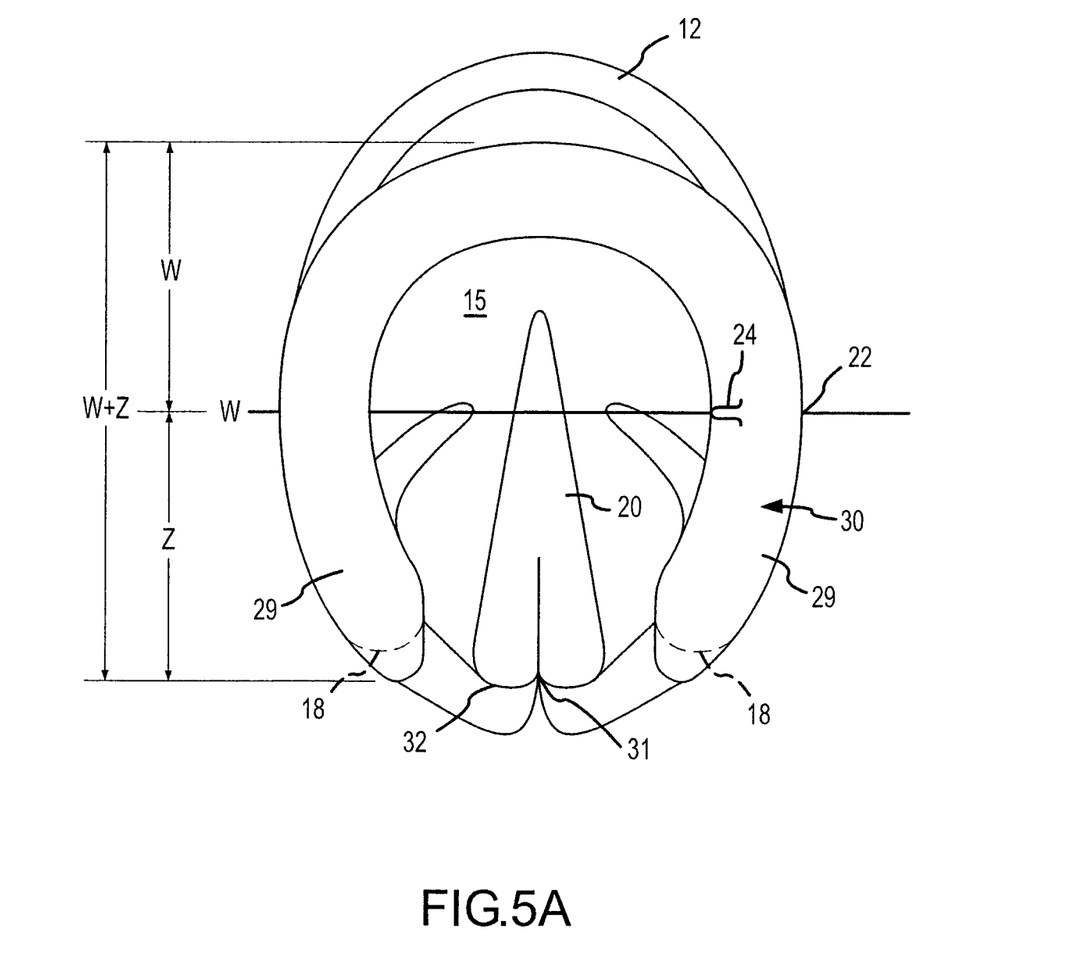
FIG. 5A is a diagrammatic bottom view of the hoof shown in FIG. 5.

FIGS. 5 and 5A illustrate a distorted hoof similar to the one shown in FIG. 3. The distortion and imbalance can be corrected by applying the shoeing method and using the horseshoe 30 of the present invention. The shoeing process begins by first exfoliating the chalky sole material covering the sole 15. The ground contacting surface 14 of the hoof wall 10 is then trimmed to the level 4a of the exfoliated functional sole 15. The apex 22 of the hoof wall curve that defines the widest part of each lateral side of the hoof is established by sighting and is marked. A horseshoe 30 having a longitudinal midline 24 clearly indicated thereon is applied to the hoof by aligning the longitudinal mid line with the marked hoof apex on each lateral side of the hoof wall. The palmar surfaces of the arms 29 of the shoe are made to terminate at the caudal most part of the central sulcus 31 of the frog buttress 32. The elongated portion of the toe that extends beyond the front tip of the horseshoe 30 is trimmed to a position shown by reference numeral 32 in FIG. 5. This positioning of the horseshoe emphasizes matching the mid line of the horseshoe with the widest part of the hoof and trimming the hoof for proper balance as opposed to fitting a shoe to a distorted hoof.

The alignment and positioning described results in a balance of the shod hoof heretofore not seen in horses with normal horseshoes. Inherent in the method just described is a horseshoe that is custom fitted to a particular foot. That is, the horseshoe is of a size and dimension to fit across the widest part of the foot on which the shoe is to be worn. The length of the shoe on its palmar side from its mid-line to the terminal ends of the arms must match the distance from the widest part of the sole to the caudal part of the sulcus. The bottom or ground contacting surface of the shoe may be of any shape, depending on the particular discipline or pathology being addressed.

In summary, the device, whether it be a horseshoe, a pad or other form of foot protection, should have an overall palmar surface length that is equal to twice the distance from the widest part of the sole to the back of the hoof frog, making the shoe balanced 50/50 around the widest part of the foot.

What is claimed is:

1. A method for applying shoes to the hoof of a horse comprising the steps of,
   establishing the apex of the sole surface curve that defines each lateral side of the hoof wall,
   applying a horseshoe to the hoof by aligning the longitudinal mid line of each arm of the horseshoe with the respective apex on each lateral side of the hoof wall and the sole surface, aligning the terminal ends of the arms of the horseshoe with the caudal part of the central sulcus of the hoof frog, and establishing the palmar length of the horseshoe as being twice the distance from the widest part of the hoof sole to the caudal part of the central sulcus of the hoof.

2. The method of claim 1 and further including a first step of
   exfoliating the chalky sole material covering the sole of the hoof and trimming the ground contacting portion of the hoof wall to the level of the exfoliated sole.

3. The method of claim 2 and further including the step of trimming off at least a portion of the elongated toe of the hoof for proper hoof balance.

\* \* \* \* \*